United States Patent
Heraly et al.

[19]

[11] Patent Number: 6,075,225
[45] Date of Patent: Jun. 13, 2000

[54] CONTROL INTERFACE FOR WELDING DEVICE

[75] Inventors: Todd M. Heraly, Green Bay; Neal M. Borchert, Kaukauna; Stephen P. Ferkel, Appleton, all of Wis.

[73] Assignee: Illinois Tool Works, Glenview, Ill.

[21] Appl. No.: 09/053,162

[22] Filed: Apr. 1, 1998

[51] Int. Cl.⁷ .................................................. B23K 9/10
[52] U.S. Cl. ......................................................... 219/130.5
[58] Field of Search ............................. 219/130.5, 130.1, 219/130.21, 130.31, 130.32, 130.33, 130.4, 132, 137 PS

[56] References Cited

U.S. PATENT DOCUMENTS

| | | | |
|---|---|---|---|
| 2,441,406 | 5/1948 | Freeman et al. | 219/130.1 |
| 3,059,164 | 10/1962 | Johnson | 219/130.1 |
| 3,581,051 | 5/1971 | Brown | 219/130.5 |
| 4,410,788 | 10/1983 | Summers et al. | 219/130.1 |
| 4,868,366 | 9/1989 | Joseph et al. | 219/132 |
| 5,278,390 | 1/1994 | Blankenship | 219/130.5 |

OTHER PUBLICATIONS

Square Wave TIG 275 Brochure.

*Primary Examiner*—Clifford C. Shaw
*Attorney, Agent, or Firm*—Foley & Lardner

[57] ABSTRACT

A control interface for a welding device facilitates selection of a welding process and of the various operating parameters associated with the welding process. The control interface includes a process selector to select one of a plurality of welding processes, such as AC TIG or DC STICK, and a plurality of parameter selectors for selecting operating parameters associated with the welding process, each parameter selector having a plurality of settings. Selection of the various parameter settings is constrained by a controller which recalls from memory the parameter settings associated with the selected welding process, and which may further enable, disable or default to particular settings based on the selected welding process or the selection of other settings.

24 Claims, 4 Drawing Sheets

| | CURRENT | | OUTPUT | | START | | | |
|---|---|---|---|---|---|---|---|---|
| | REMOTE | PANEL | ON | REMOTE | OFF | LIFT | HF START | HF CONT |
| AC TIG | E | E | E | DEF | E | D | E | E |
| AC STICK | E | E | E | DEF | E | D | D | |
| DC TIG | E | E | E | DEF | E | E | E | E |
| DC STICK | E | E | E | DEF | E | D | D | D |

E = ENABLED
D = DISABLED
DEF = DEFAULTS TO THIS POSITION UPON POWER-UP, CHANGE IN POWER SELECTOR AND PROCESS SELECTOR

FIG. 3

| | CURRENT | OUTPUT | START MODE |
|---|---|---|---|
| AC TIG | REMOTE | REMOTE | HF CONT |
| AC STICK | PANEL | REMOTE | OFF |
| DCEP TIG | REMOTE | REMOTE | HF START |
| DCEP STICK | PANEL | REMOTE | OFF |
| DCEN TIG | REMOTE | REMOTE | HF START |
| DCEN STICK | PANEL | REMOTE | OFF |

FIG. 4

CONTROL INTERFACE FOR WELDING DEVICE

FIELD OF THE INVENTION

The present invention relates generally to a welding device and more specifically to a control interface for a welding device.

BACKGROUND OF THE INVENTION

Many methods of welding are known in the art, each with its own advantages and disadvantages. Common welding processes include gas welding, oxyacetylene brazing and soldering, shielded metal arc welding (SMAW) or "STICK" welding, metal inert gas (MIG) or "wire feed" welding, gas tungsten arc welding (GTAW) or TIG welding, and plasma cutting. Each welding process requires special equipment that the welder uses to perform the welding operation. Some of this equipment can be used for multiple welding operations. The preferred embodiment of the present invention is directed to a welding device including a welding power source adapted for both STICK and TIG welding processes, though the present invention will surely find applications in devices for other welding processes.

Both STICK and TIG welding processes require generation of a high-current electrical arc between an electrode and a base metal or workpiece. This current is supplied by a welding power source. When performing a TIG welding process, the welder holds a torch having a tungsten electrode and a channel for dispensing a protective inert gas to the welding site. The welder strikes an arc and feeds a bare welding rod to the welding site, thereby creating a molten puddle. The molten puddle hardens to leave a weld bead joining two pieces of metal. STICK welding is similar, except that the electrode is a stick electrode coated with flux. The stick electrode is consumed in the welding process and becomes part of the weld bead. The flux protects the weld while it cools and is thereafter chipped away by the welder.

Early welding devices included a simple power source, a shielding gas cylinder including an inert gas for TIG, a torch and tungsten electrode (or stinger for STICK) and a work clamp for providing a ground reference for the electrode. The power source of these devices typically included a user-selectable amperage dial for setting a DC output amperage level and a STICK/TIG selector switch for selecting the desired type of welding process. The discovery that welding with the electrode negative (straight polarity) provides deeper penetration, while welding with the electrode positive (reverse polarity) provides better cleaning of oxides from the base metal led to improved welding devices which allowed the welder to select between the two polarities. Further improvements to the early welding devices included offering an AC squarewave output power option wherein the electrode is positive for a half cycle then negative for a half cycle. Further improvements in the AC squarewave output power allowed the user to change the duration of the cycle during which the electrode was negative versus positive, thereby providing an adjustable balance of penetration and cleaning. Because an AC arc was difficult to start and maintain, however, various arc starting modes and arc rectification circuits were created. Before long, the simple welding device of the past had developed into a complex unit with many adjustable functions and options.

As the welder's options in creating, maintaining and controlling the arc have increased, control interfaces and control circuitry have fallen behind. Many welding devices lack adequate control features for assisting the welder in making selections to best start and maintain the arc. Current welding devices utilize hard toggle switches for selecting operating parameters. With increasing options, it is possible for a welder to select an invalid or nonoptimal combination of operating parameters using these hard toggle switches. For example, certain start modes may be invalid in combination with the selected type of welding process or other selected operating parameters. To disable these options, special discrete component circuity must be implemented to prevent malfunction of and possibly even damage to the welding power source. Furthermore, these prior art welding devices are unable to offer preferred selections designed to optimize a particular type of welding process, to store in memory certain parameter settings that the welder may prefer, or to default to certain selections based on the selections of other parameter settings.

Accordingly, a need exists for a welding device that overcomes these and other disadvantages of the prior art. Such a welding device would automatically and selectively disable, enable and default selectors to certain parameter settings based on the selected welding process or the selection of other parameter settings, thus facilitating the setup of the welding device. The welding device would further store selector settings for later recall, such that if input power is interrupted or the welder switches between welding processes during a welding cycle, the welder could immediately return to the previous setup. Moreover, the welding device would also advantageously suggest preferred settings to the welder, thus simplifying the welder's myriad of choices.

SUMMARY OF THE INVENTION

These and other needs are accomplished by the present invention in which, according to one embodiment, a control interface for a welding device comprises a process selector, a plurality of parameter selectors, a memory, and a controller in communication with the process selector, the parameter selectors, and the memory. The process selector selects one of a plurality of welding processes to be performed by the welding device. The parameter selectors are used to select the operating parameters associated with the welding processes, each parameter selector having a plurality of parameter settings. The memory stores a parameter setting for at least one of the parameter selectors, and the parameter setting is associated with a particular welding process. The controller controls selection of the parameter settings for the at least one parameter selector by recalling the stored parameter setting from memory upon selection of the particular welding process.

In one aspect of the invention, selection of the parameter settings further may be controlled by disabling some of the parameter settings based on the selected welding process. Further, selection of the parameter settings may include indicating a preferred parameter setting, which may be accomplished by activating a light emitting diode.

In another aspect of the invention, selection of some of the parameter settings may be further based on the selection of other parameter settings.

According to another feature of the present invention, the stored parameter setting may be replaced with a new parameter setting if the parameter selector is set to the new parameter setting during the particular welding process.

According to yet another aspect of the invention, the process selector and the parameter selectors are disposed on a front panel of the welding device.

Another embodiment of the invention provides a method of configuring a welding device to perform a welding process. According to the method, a setting for at least one operating parameter is stored in a memory and the setting is associated with a particular welding process. When the particular welding process is selected for performance by the welding device, the selection of settings for operating parameters is controlled by recalling the stored setting from memory.

In one aspect of the invention, the particular welding process may be either an AC, a DCEN, or a DCEP welding process and may further be either a STICK or a TIG welding process.

BRIEF DESCRIPTION OF THE DRAWINGS

The present invention will become more fully understood from the following detailed description, taken in conjunction with the following drawings, in which like reference numerals denote like elements and:

FIG. 3 is a table indicating the interrelationship of some of the selectors of the user interface of FIG. 1 according to a preferred embodiment of the present invention.

FIG. 4 is a table indicating the manufacturer-programmed defaults of some of the selectors of the user interface of FIG. 1 according to a preferred embodiment of the present invention.

DETAILED DESCRIPTION OF A PREFERRED EMBODIMENT

The present invention is directed toward a control interface for a welding device which automatically controls selection of process parameter settings associated with a user-selected welding process. The control interface includes a user interface which provides the vehicle by which the user selects the welding process and any available process parameter settings. Selection of the parameter settings is governed by a controller which can restrict availability of settings or suggest preferred settings based on the welding process and/or other parameter settings selected by the user.

Figure 1:
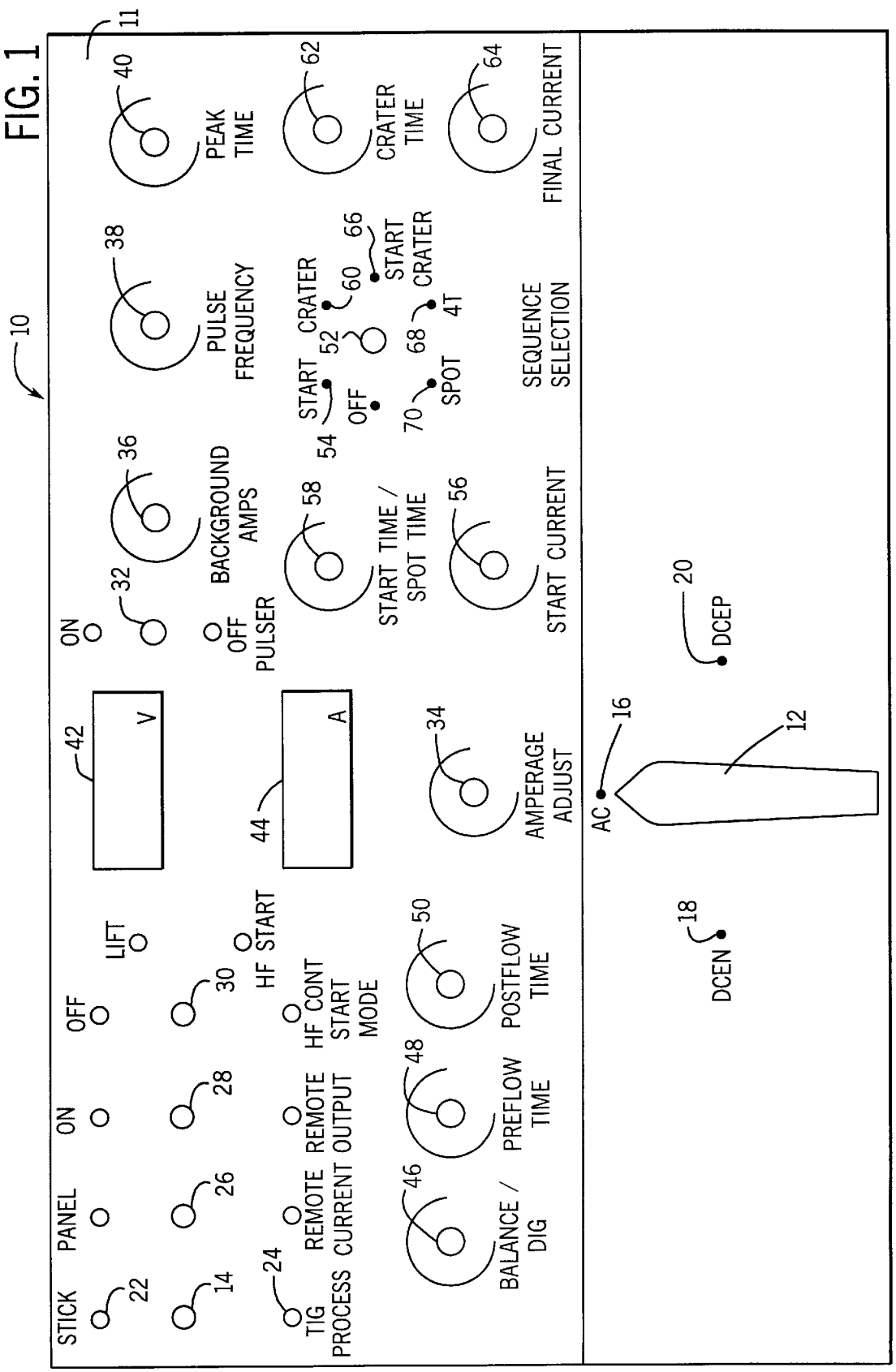
FIG. 1 is a front view of the layout of a user interface for a control interface, in accordance with a preferred embodiment of the present invention.

Referring now to FIG. 1, the layout of a preferred embodiment of a user interface 10 for the control interface of the present invention is shown. Although this preferred embodiment is illustrated in great detail in FIG. 1, the present invention should not be construed as limited to the layout in FIG. 1, but rather limited only by the language of the claims appended hereto.

User interface 10 includes a front panel 11, a plurality of selectors (discussed below) and a plurality of indicia, such as displays 42, 44 for indicating amperage and voltage, and light emitting diodes (LEDs) 22, 24 for indicating selected or preferred parameter settings. User interface 10 could take many forms other than a front panel on which are mounted a plurality of selectors and indicia associated with the selectors. For example, interface 10 may be a display, such as a cathode ray tube or a flat screen or liquid crystal display, which visually displays selectors, parameter settings, and indicia.

The plurality of selectors on user interface 10 include a power selector 12 and a process type selector 14, which together provide for selecting a particular welding process, and a plurality of parameter selectors (each of which will be discussed below) for selecting parameters related to the selected welding process. "Selector," as used herein, includes any or a combination of a plurality of selectors, such as analog, digital, discrete-position analog, toggle, dial and rotary, membranes and discrete push-button switches, and displays having a number of options from which the user may select by, for example, clicking with a mouse, scrolling through menus or touching a screen. In the preferred embodiment, power selector 12 is a power rotary switch, and selector 14 and various of the parameter selectors are discrete push-button switches, while various others of the parameter switches are dials or rotary switches, all of which are mounted on front panel 11.

Power selector 12 includes a plurality of settings for selecting the desired type of welding output power, including AC power 16, DC electrode negative (DCEN) power 18 and DC electrode positive (DCEP) power 20. Process type selector 14 includes a plurality of settings representative of the desired type of welding process, such as, for example, STICK and TIG. Together, power selector 12 and process type selector 14 enable the welder to select the optimum welding process for the particular application. In the embodiment illustrated in FIG. 1, the welder may choose between AC STICK, AC TIG, DCEN STICK, DCEN TIG, DCEP STICK and DCEP TIG. Although the welding process in this embodiment is selected through the use of two selectors 12 and 14, an alternative embodiment of the invention may incorporate the functions of selectors 12 and 14 in a single selector.

The plurality of parameter selectors illustrated in FIG. 1 include a current selector 26, an output selector 28, and a start mode selector 30. Current selector 26 selects between two options for controlling the output current level: (1) a PANEL setting, wherein the output current level is controlled via an amperage adjust dial 34, and (2) a REMOTE setting, wherein the output current level is controlled via a remote input device 122, such as a foot pedal or finger trigger (see FIG. 2).

Output selector 28 selects between two options for enabling output power: (1) an ON setting, the selection of which enables the flow of output current, and (2) a REMOTE setting, wherein output current flow is enabled by depressing or activating remote input device 122. Input device 122 can both enable output current flow and control the output current level, or, alternatively, two input devices may be used.

Start mode selector 30 selects one of a plurality of automatic start modes for initiating the welding arc. The start modes preferably include a lift arc start mode (LIFT), a high frequency start mode (HF START), and a high frequency continuous start mode (HF CONT). Start mode selector 30 further includes an OFF setting which disables the start modes if the welder desires to generate and maintain the welding arc using conventional, manual techniques. A manual start is performed by striking the electrode against a copper start plate or the workpiece. LIFT is performed by enabling the output current, touching the electrode to the workpiece, and lifting the electrode to form the arc. Both HF START and HF CONT involve the use of a high frequency signal that initiates the arc by jumping the gap between the electrode and the workpiece. HF START provides a high frequency signal only during the initial formation of the arc and may be used for both AC and DC processes. HF CONT, which also may be used for both AC and DC processes, provides a continuous high frequency signal during the welding process, thus both initiating the arc at the start of the welding process and maintaining the arc during the welding process, as may be required.

Other preferred parameter selectors include a pulser selector 32, a balance/dig selector 46, a preflow time selector 48, a postflow time selector 50, and a sequence selector 52. Pulser selector 32 enables or disables the pulser function of the welding device. The pulser function allows the welder to give a pulse of full amperage (the magnitude of which may be selected via amperage adjust selector 34), followed by a pulse of reduced amperage (the magnitude of which may be selected via a background amps selector 36). This feature allows the weld puddle to solidify between weld solder applications, thus providing better puddle control and preventing the welder from melting holes in the workpiece. Also associated with the pulser function are a pulse frequency selector 38 and a peak time selector 40.

Balance/dig selector 46 provides balance and dig options which may further optimize the welding process. Dig control may be desirable during STICK welding processes to prevent the electrode from sticking to the base metal or workpiece. Balance control may be desirable during AC TIG welding processes to adjust the balance, or duty cycle, of the AC waveform, thereby optimizing the balance of cleaning and penetration times.

Preflow time selector 48 and postflow time selector 50 control the flow of the inert gas expelled from the torch during TIG welding.

Sequence selector 52 enables the welder to choose from one of several sequence options which offer further features to optimize the welding process. The sequence options may include, for example, a start option 54, a crater control option 60, a start/crater option 66, a 4T option 68, and a spot option 70. Start option 54 allows the welder to select a start current level (set by a start current selector 56) to provide a starting amperage that is different than the desired weld current level. This starting amperage provides a soft start in TIG welding processes or a more consistent arc strike in STICK welding processes. The welder may use a start time/spot time selector 58 to choose a duration after which the current level will switch from the start current level to the weld current level.

Crater control option 60 provides for gradual reduction of the current level at the end of a weld cycle to a final current level (set by a final current selector 64) over a selected period of time (set by a crater time selector 62). The welder may desire to select crater control option 54 either to eliminate the crater at the end of a weld or when welding materials prone to cracking.

Start/crater option 66 allows the welder to utilize both start option 54 and crater control option 60 together.

4T option 68 allows the welder to press and hold a torch trigger to start the gas preflow and the arc at a start current level set by start current selector 56. Then, upon release of the trigger, the arc resumes at the weld current level set by amperage adjust selector 34. When the trigger is pressed again, crater time begins (as set by crater time selector 62) and the arc drops to the final current level (as set by final current selector 64). When the trigger is released, the arc extinguishes and the gas postflow time begins.

Finally, spot option 70 allows the welder to perform spot welding operations. Start time/spot time selector 58 is used to set the duration of each spot weld.

Having thus reviewed the preferred selectors on user interface 10, we turn now to a discussion of their interrelationships with one another. In a preferred embodiment, the selectors of FIG. 1 are coupled as inputs to a general purpose controller 102 (see FIG. 3), preferably including an Intel 80C196KC-20 or, is alternatively, an equivalent or superior controller. However, in other embodiments of the invention, the functions of controller 102 may be performed by an electrical circuit comprising discrete components to which the selectors provide input signals. Thus, controller 102 may operatively control the selectors of FIG. 1 and, in particular, may operatively control selection of the plurality of parameter settings of each selector. Examples of this control follow, though one skilled in the art will recognize that many other interrelationships of selectors are possible while still keeping within the scope of the present invention.

Referring to FIG. 3, a table indicating the interrelationship of the selectors according to a preferred embodiment of the present invention is illustrated. The welder selects a particular welding process by using power selector 12 to select DCEN, DCEP or AC, then using process type selector 14 to select either a TIG or STICK welding process. Having thus selected a welding process, FIG. 3 illustrates parameter settings associated with the particular welding process which controller 102 selectively enables, disables or offers as defaults.

For example, if the welder selects AC TIG, current selector 26 may be set to either REMOTE or PANEL, and output selector 28 defaults to REMOTE thereby preventing the flow of output current, although the welder may thereafter set output selector 28 to ON. Also in AC TIG, controller 102 enables the welder to set start selector 30 to either OFF, HF START, or HF CONT; the LIFT option, however, is disabled for AC TIG and, thus, cannot be used even if the welder attempts to select the LIFT setting. For AC STICK, DCEN TIG, DCEP TIG, DCEN STICK, and DCEP STICK, the same options are available on current selector 26 and output selector 28 as described above for AC TIG. However, for AC STICK and DC STICK, controller 102 disables all start modes except for OFF; and for DC TIG, controller 102 enables all start modes including OFF. As indicated in FIG. 3, according to this preferred embodiment, output selector 28 defaults to REMOTE whenever the welder either applies input power to welding device 100, changes the setting of power selector 12, or 21) changes the setting of process type selector 14.

Numerous other interrelationships among the selectors may also exist. For example, if sequence selector 52 is set to crater option 60, start/crater option 66, 4T option 68 or spot option 70, then controller 102 disables or deselects the REMOTE setting of current selector 26 because REMOTE is an invalid option. As stated hereinbefore, the above-stated interrelationships are merely exemplary, and many other interrelationships can be established among the disclosed selectors and between one or more of the disclosed selectors and additional welding selectors not shown but well-known in the art.

Figure 2:
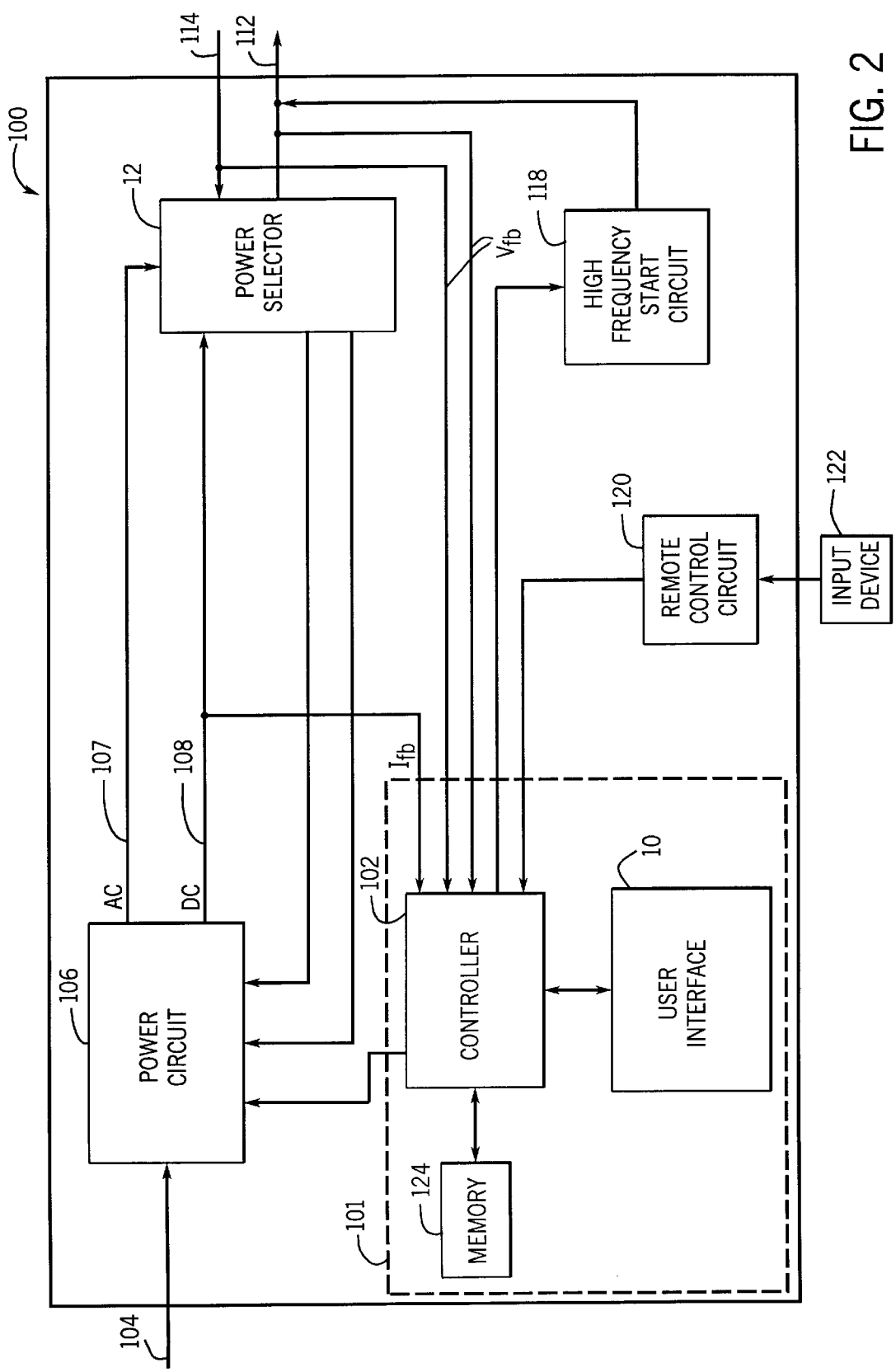
FIG. 2 is a block diagram representing the major functional components, including the control interface, of a welding device, according to a preferred embodiment of the present invention.

Referring now to FIG. 2, FIG. 2 is a block diagram of a preferred embodiment of a welding device according to the present invention. Welding device 100 includes a control interface 101 which comprises user interface 10, controller 102 and a memory 124. Power is input to welding device 100 at power input 104. Power is provided to a power circuit 106 which provides power conditioning using methods well-known in the art. For example, power conditioning may be performed by a phase-controlled rectifier circuit or by other well-known power converter or inverter topologies. Controller 102 provides control signals to power circuit 106 based on received output current ($I_{fb}$) and/or voltage feedback ($V_{fb}$) signals. Power circuit 106 provides AC output power and DC output power on AC and DC power outputs 107, 108, respectively. The AC and DC power outputs 107, 108 from power circuit 106 are coupled to power selector 12 which enables the welder to select whether AC or DC output power is applied to an electrode output 112. Further, if DC output power is desired, power selector 12 enables the welder to select whether to apply a positive DC voltage (i.e., DCEP) or a negative DC voltage (i.e., DCEN) to electrode output 112 with respect to a work clamp input 114.

Controller 102 also interfaces with a high frequency start circuit 118, which performs the HF START and HF CONT functions (described above) in response to control signals from controller 102. As illustrated in FIG. 2, controller 102 is further coupled to a remote control circuit 120, which receives input signals from remote input device 122, such as the foot pedal or finger trigger discussed above.

In the preferred embodiment, controller 102 is programmed to carry out the enable, disable, and default functions described above with reference to FIG. 2 by methods well-known to those skilled in the art. Controller 102 controls selection of the settings of the various selectors based on input signals which are representative of the settings of various other selectors. For example, in a preferred embodiment, the setting of power selector 12 is detected by electrical contacts, one at each setting (i.e., DCEN, DCEP, and AC), and input to controller 102. Alternatively, the setting of power selector 12 may be determined based on feedback signals (e.g., $V_{fb}$) received from the output of welding device 100, which are representative of the selected type of output power.

As an example of controller 102 controlling selection, FIG. 3 illustrates that controller 102 disables the LIFT start mode when power selector 12 is set to AC and process type selector 14 is set to TIG. If selector 30 is a discrete push-button switch, the user may press the switch to change the selected start mode. Controller 102 provides an indication of the selected start mode by illuminating the indicator on user interface 10 that corresponds to the selected start mode. Thus, if HF START is initially selected or active, the HF START indicator will be illuminated. If the user then presses the switch to select a different start mode, a signal is sent to controller 102 which, in response, loads program code necessary to run the HF CONT start mode and outputs a signal to illuminate the HF CONT indicator. If the user presses the switch again, a signal is sent to controller 102 which, in response, loads program code necessary for the OFF mode and provides a signal to illuminate the OFF indicator. If the user then presses the switch again, controller 102 will skip the LIFT start mode and proceed instead to the HF START mode because inputs from power selector 12 and process type selector 14 indicate that the user has selected an AC TIG welding process. This description is illustrative of one manner in which controller 102 may disable a parameter setting.

Control interface 101 also features a memory retention capability. As shown in FIG. 2, controller 102 is coupled to memory 124, which preferably is a non-volatile memory, and more preferably a EEPROM. Memory 124 stores the parameter settings for process type selector 14, current selector 26, output selector 28 and start mode selector 30, although the settings for all or others of the parameter selectors may also be stored.

Referring to FIG. 4, FIG. 4 is a table indicating the pre-programmed defaults of some of the selectors of user interface 10 of FIG. 1 according to a preferred embodiment of the present invention. These defaults are stored in memory 124 during manufacture and are recalled upon powering up welding device 100 based on the position of power selector 12 and process type selector 14. If AC is selected on power selector 12, process type selector 14 defaults to TIG, current selector 26 defaults to remote, output selector 28 defaults to remote, and start mode selector 30 defaults to HF CONT. If the welder then changes process type selector 14 to STICK, current selector 26 defaults to PANEL, output selector 28 defaults to REMOTE, and start mode selector 30 defaults to OFF. If DCEP is selected on power selector 12, process type selector 14 defaults to STICK, current selector 26 defaults to PANEL, output selector 28 defaults to REMOTE, and start mode selector 30 defaults to OFF. If the welder then changes process type selector 14 to TIG, current selector 26 defaults to REMOTE, output selector 28 defaults to REMOTE, and start mode selector 30 defaults to HF START. Finally, if DCEN is selected on power selector 12, process type selector 14 defaults to TIG, current output selector 26 defaults to REMOTE, output selector 28 defaults to REMOTE, and start mode selector 30 defaults to HF START. If the welder then changes process type selector 14 to STICK, current selector 26 defaults to PANEL, output selector 28 defaults to REMOTE, and start mode selector 30 defaults to OFF. These default settings are not intended to be limited by the preferred embodiment shown in FIG. 4. Numerous other defaults can be programmed and retained in memory 124, including defaults for selectors not shown in FIG. 4, e.g. preflow time selector 48 and pulser selector 32. These default settings could be programmed to be recalled upon each power up of welding device 100, or preferably the memory locations containing these default settings are overwritten by subsequent welder selection as described below. In the latter case, when input power is removed from welding device 100, the parameter settings are retained in memory 124 so that the welder can resume welding with the same selections chosen before powering down when input power is reapplied.

Memory 124 also provides for recall of stored parameter settings for various selectors in the middle of a welding session, and preferably allows recall of the settings associated at least with selectors 14, 26, 28 and 30. According to this feature, controller 102 stores in memory 124 certain of the parameter settings that have been selected by the welder at the start of a particular welding process. When the welder switches power selector 12 to another setting, the previously chosen parameter settings are saved and assigned to the previous setting of power selector 12. Alternatively, these parameter settings could be saved at the time they are selected by the welder. When the previous power selector setting is again selected by the welder during the welding session, the previously chosen parameter settings are automatically recalled from memory 124. Thus, according to the preferred embodiment of the present invention, the welder may save selector parameter settings that are associated with each power selector setting (i.e., DCEN, AC and DCEP). Alternatively, the stored parameter settings may be assigned to the previously selected process type setting (i.e., STICK or TIG) or to a combination of the output power setting and the process type setting.

In the preferred embodiment of the present invention, controller 102 may activate visual indicia on user interface 10 to indicate preferred parameter settings based on the setting of other selectors. For example, if the welder selects DCEN, controller 102 may activate an indicator 24 associated with the TIG setting for process type selector 14 (see FIG. 1). Indicator 24 preferably flashes such that the welder is alerted that TIG is the welding process that is most frequently used when the output is set to DCEN. The welder may then choose whether to accept the recommendation or to opt for a different setting (in this case, STICK). In the preferred embodiment, indicator 24 is a light emitting diode. However, indicator 24 may be any type of indicator that is visible to the user, such as illuminated, flashing or highlighted icons or characters displayed on user interface 10.

Although the foregoing description has been provided for the presently preferred embodiment of the invention, the invention is not intended to be limited to any particular arrangement, but is defined by the appended claims. For example, selectors in addition to those or different than those shown in the preferred embodiment may be used and interrelationships created therebetween. Likewise, although STICK and TIG processes are used in this preferred embodiment, the present invention has applications in numerous other welding devices. These and other alternative configurations of the invention that may occur to those skilled in the art are intended to form a part of the invention to the extent such alternatives fall within the scope of the appended claims.

What is claimed is:

1. A control interface for a welding device capable of performing a plurality of welding processes, comprising:
   a process selector to select one of a plurality of welding processes, the process selector comprising a manually-operated selector;
   a plurality of parameter selectors to select operating parameters associated with the plurality of welding processes, each parameter selector having a plurality of parameter settings;
   a memory to store a parameter setting of at least one of the plurality of parameter selectors, wherein the stored parameter setting is associated with a particular welding process of the plurality of welding processes; and
   a controller in communication with the process selector, the plurality of parameter selectors, and the memory, wherein, upon operator selection of the particular welding process with the manually-operated selector, the controller controls selection of the plurality of parameter settings for the at least one parameter selector by recalling the stored parameter setting from memory.

2. The control interface as recited in claim 1, wherein the stored parameter setting is associated with either a DCEN, a DCEP, or an AC welding process.

3. The control interface as recited in claim 2, wherein the stored parameter setting is further associated with at least either a STICK or a TIG welding process.

4. The control interface as recited in claim 1, wherein the plurality of parameter selectors includes at least one of an arc starting mode selector, a current control selector, and an output control selector.

5. The control interface as recited in claim 1, wherein the controller further controls selection of the parameter settings by disabling selection of one of the parameter settings based on the selected welding process.

6. The control interface as recited in claim 1, wherein the controller further controls selection of the parameter settings by activating an indicator that provides a visible indication of a preferred parameter setting of one of the plurality of parameter selectors based on the selected welding process.

7. The control interface as recited in claim 1, wherein the stored parameter setting associated with the particular welding process is replaced in the memory with a new parameter setting for the at least one parameter selector if the at least one parameter selector is set to the new parameter setting during the particular welding process.

8. The control interface as recited in claim 1, wherein the welding device has a power input to receive input power, and the stored parameter setting is retained in memory if the input power is removed from the power input.

9. The control interface as recited in claim 1, wherein the stored parameter is retained in the memory if the process selector selects a new welding process of the plurality of welding processes.

10. The control interface as recited in claim 1, further comprising a user interface, wherein the plurality of parameter selectors are disposed on the user interface.

11. The control interface as recited in claim 10, wherein the user interface is a front panel of the welding device and the plurality of parameter selectors are switches mounted on the front panel.

12. The control interface of claim 1, the memory to receive the parameter setting from the operator.

13. A method for configuring a welding device to perform a welding process selected from a plurality of welding processes the welding device is capable of performing, the selected welding process having a plurality of operating parameters associated therewith, each operating parameter having a plurality of settings, the method comprising:
   receiving from an operator a setting for at least one operating parameter;
   storing in a memory the setting for at least one operating parameter;
   associating the stored setting with a particular welding process of the plurality of welding processes; and,
   upon selecting the particular welding process for performance by the welding device, controlling selection of settings for the at least one operating parameter by recalling the stored setting for the at least one operating parameter from the memory.

14. The method as recited in claim 13, wherein the particular welding process is one of an AC, a DCEN, and a DCEP welding process.

15. The method as recited in claim 14, wherein the particular welding process further is one of at least a TIG and a STICK welding process.

16. The method as recited in claim 13, wherein controlling selection further includes disabling one of the settings of one of the plurality of operating parameters.

17. The method as recited in claim 13, further comprising replacing in memory the stored setting with a new setting if the new setting is selected for performing the particular welding process.

18. The method as recited in claim 13, further comprising controlling selection of the settings of a second operating parameter based on the selection of the setting of a first operating parameter.

19. The method of claim 13, wherein the particular welding process is selected by an operator via a manually-operated selector.

20. A welding device, comprising:
   a power selector to select one of a plurality of power outputs for performing a plurality of welding processes, the power selector comprising a manually-operated selector;
   a process type selector to select one of the plurality of welding processes;
   a plurality of parameter selectors to select parameter settings associated with the plurality of welding processes, each parameter selector having a plurality of parameter settings;

a memory to store parameter settings of at least some of the plurality of parameter selectors; and a controller in communication with the power selector, the process type selector, the plurality of parameter selectors, and the memory, wherein, upon selection of a welding process using at least one of the manually-operated selector and the process type selector, the controller controls selection of the parameter settings by recalling from the memory the stored parameter settings for the selected welding process.

21. The welding device as recited in claim 20, wherein the controller further controls selection by disabling one of the parameter settings of at least one parameter selector based on the selected welding process.

22. The welding device as recited in claim 20, wherein the stored parameter settings are replaced in the memory new parameter settings if any one of the parameter selectors is set to a new parameter setting for performing the selected welding process.

23. The welding device as recited in claim 20, wherein the plurality of welding processes includes at least STICK and TIG.

24. The welding device of claim 20, the memory to receive the parameter settings of at least some of the plurality of parameter selectors from the operator.

* * * * *